United States Patent [19]

Briese

[11] 4,378,184

[45] Mar. 29, 1983

[54] ROTARY TOOL CUTTING INSERT

[76] Inventor: Leonard A. Briese, 5039 Browndeer La., Rancho Palos Verdes, Calif. 90274

[21] Appl. No.: 215,937

[22] Filed: Dec. 12, 1980

[51] Int. Cl.³ .............................................. B26D 1/00
[52] U.S. Cl. ..................................... 407/113; 407/40; 407/42; 407/48; 407/103; 407/120; 411/130; 411/294
[58] Field of Search ...................... 407/34, 36, 40, 42, 407/48, 64, 65, 90, 103, 104, 105, 113, 120, 7; 411/129, 130, 294; 403/369-371, 375

[56] References Cited

U.S. PATENT DOCUMENTS

| | | | |
|---|---|---|---|
| 1,008,086 | 11/1911 | Storsberg | 411/294 |
| 2,944,323 | 6/1960 | Stadler | 407/119 |
| 3,371,397 | 3/1968 | Coleshill et al. | 407/36 |
| 3,670,380 | 6/1972 | Moore et al. | 407/113 |

FOREIGN PATENT DOCUMENTS

| | | | |
|---|---|---|---|
| 2315044 | 3/1973 | Fed. Rep. of Germany | 407/48 |
| 587854 | 5/1947 | United Kingdom | 407/48 |
| 933770 | 8/1963 | United Kingdom | 407/103 |
| 1254578 | 11/1971 | United Kingdom | 407/48 |

*Primary Examiner*—Leonidas Vlachos
*Attorney, Agent, or Firm*—Eric T. S. Chung

[57] ABSTRACT

An improved cutting insert for rotary cutting tools is disclosed. The cutting inserts are characterized by a center bushing made of metal that is softer than the conventional sintered tungsten carbide or titanium carbide used for the cutting body of the inserts. The center bushing may be secured on each cutting insert by using braising, shrink fitting, oxidation bonding, or high energy bonding techniques. Additionally, conventional plating techniques may be used.

5 Claims, 14 Drawing Figures

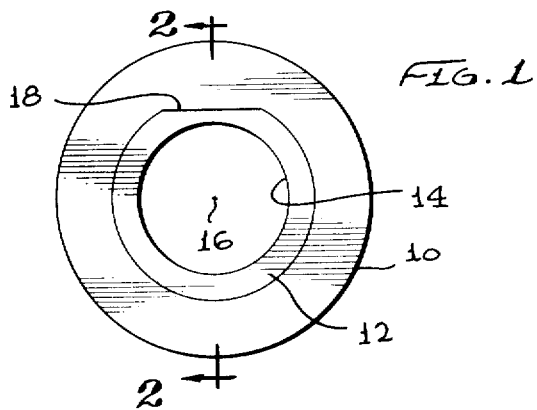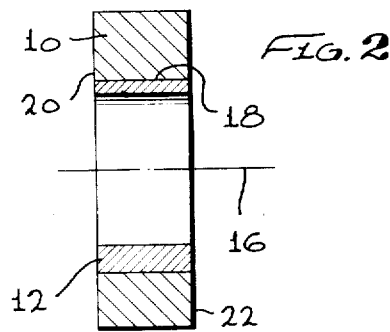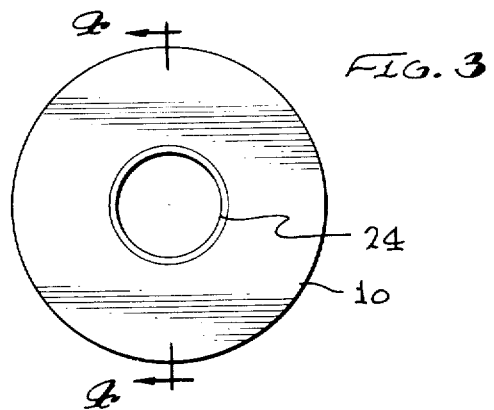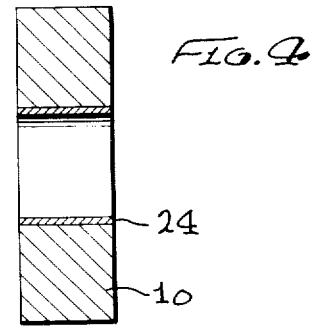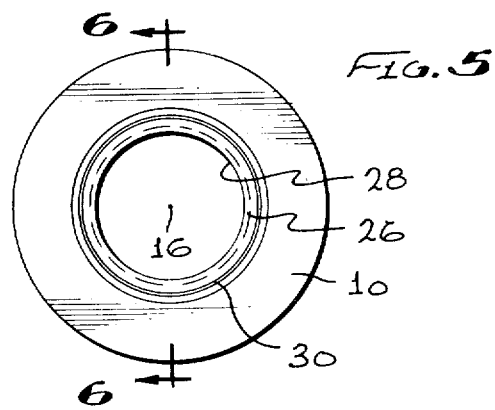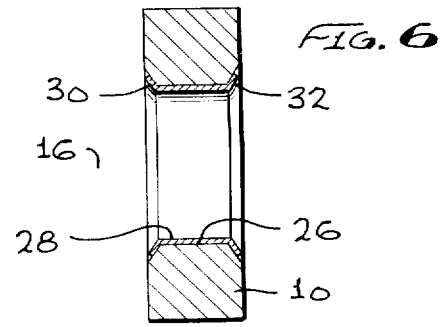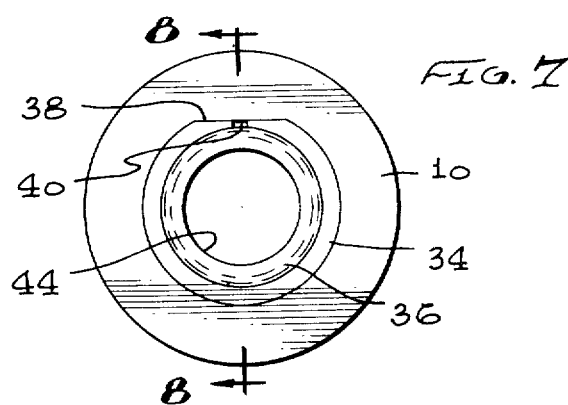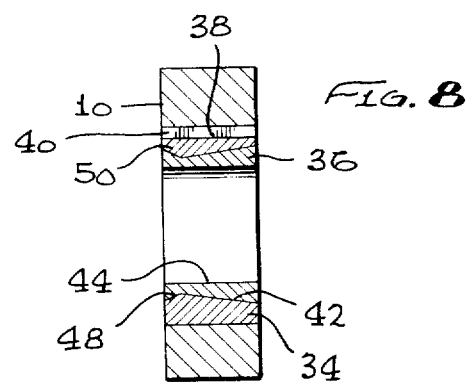

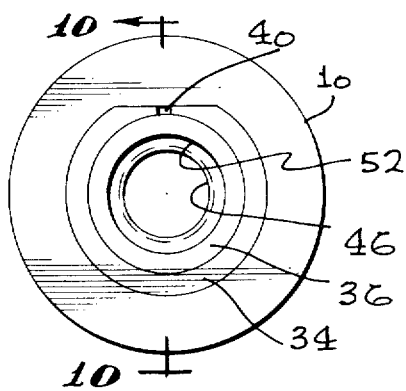
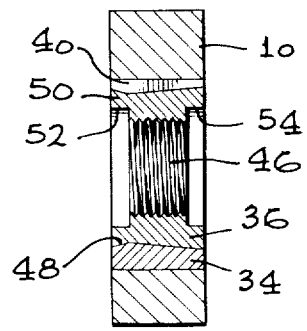
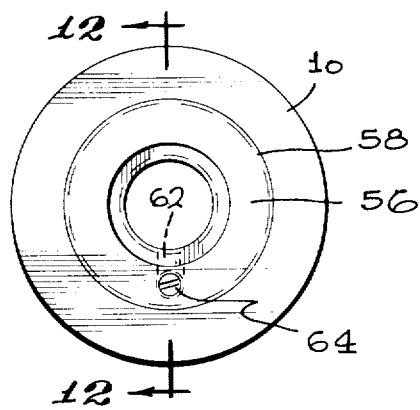
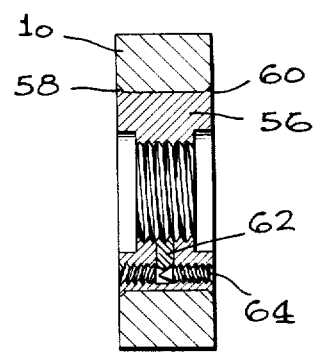
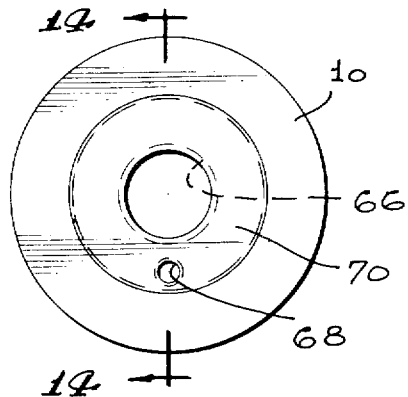
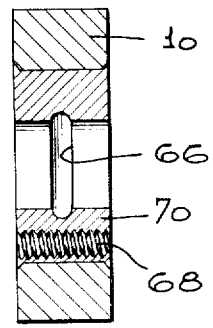

ROTARY TOOL CUTTING INSERT

BACKGROUND OF THE INVENTION

1. Field of the Invention

The present invention is directed to rotary cutting tools. More particularly, the present invention concerns an improved cutting insert that is more easily and cheaply manufactured or modified for use, and which permits smaller inventories to be stored.

2. Description of the Prior Art

Rotary cutting tools involve the use of round cutting inserts which are generally shaped as a flat washer, and which serve as the cutting surfaces of the rotary cutting tool. A representative example of such rotary cutting tools is disclosed in U.S. Pat. No. Re. 26,637.

Characteristically, the cutting inserts are mounted on a base portion of a rotary cutting tool to rotate about their own central longitudinal axis when operationally placed in contact with a workpiece. The rotation of the inserts is caused by friction between the cutting inserts and the workpiece and is continuous for as long as the cutting tool and the workpiece are in contact with each other. The speed of rotation of the insert is controllable by adjusting the radial rake of the cutting inserts.

In general, increasing the radial rake of a cutting insert will serve to increase the speed of rotation of the cutting insert and increase the dissipation of heat attendant to operation of a rotary cutting tool. Higher speeds are usually involved when the rotary cutting tool is used with harder materials, whether milling, lathing or boring is being done.

Generally, the cutting insert is mounted on a cutting surface of a tool by the use of a bolt or the like, which extends through the center aperture of the insert, and which is fastened appropriately to the base of a rotary cutting tool. Commonly, a rotary cutting tool such as used for milling would be provided with several cutting inserts each of which is mounted individually to the base of the rotary cutting tool.

It is desireable to have the central aperture of each cutting insert situated to be concentric about the longitudinal axis of the insert. In the event that concentricity is lacking, the machined surface finish is rougher than is desireable, the resulting machined surface cutting plane is irregular, and chip formation and the rotation of the cutting insert is irregular which results in total vibration of the cutting tool as well as the workpiece, unequal cutting forces and varying dimensional tolerances. Any one of these conditions will shorten the cutting life of the cutting insert and can cause damage to the machined part, the machine or the cutting tool. As a general rule, the greater the error in concentricity, the more the above conditions will prevail.

The conventional cutting insert is manufactured by using extremely hard materials such as sintered tungsten carbide or titanium carbide. Due to limitations of the sintering process, it is extremely difficult to accurately place the central aperture to obtain absolute concentricity or to obtain a desired center configuration. As an example, yields of acceptable inserts using conventional techniques to fashion the center bore can be as low as twenty percent. Boring a hardened insert requires the use of diamond cutting tools, or the like, and is a slow, tedious and expensive process.

Because it is difficult to machine a central aperture in an insert blank (without a central aperture provided thereon) most users of rotary cutting tools have no choice but to simply purchase a substantial inventory of inserts with a variety of central aperture sizes. Such an inventory would further include cutting inserts having various thicknesses and outer diameters. Clearly, purchasing and maintaining substantial inventories of cutting inserts is expensive. It is notable that the current state of the art further makes impossible the fabrication of many more complex central aperture configurations.

Finally, it is important to note that when conventional cutting inserts are mounted and removed from the hardened steel stator or rotor with a rotary cutting tool, scratching or other damage to the stator or rotor often results due to the extreme hardness of the sintered carbide material used to form the insert.

OBJECTS AND SUMMARY OF THE INVENTION

It is accordingly a primary object of the present invention to provide rotary cutting inserts having a central aperture configuration including a bushing, stud, or other configuration.

It is another object of the present invention to provide cutting inserts for rotary cutting tools that are easily fabricated to have a central aperture configuration by using easily machineable metal or cast material.

It is further object of the present invention to provide cutting inserts for rotary cutting tools that are readily machined by boring, reaming, milling, grinding, or other conventional machine process.

More particularly, rotary cutting inserts in accordance with the subject invention essentially include a center bushing or stud of easily machineable metal or cast material to permit accurate and easy fabrication of a central aperture or stud configuration for an insert. The central aperture of stud may thus be easily manufactured to accommodate any form of rotary cutting tool being used.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 1 is a side view of a cutting insert in accordance with the present invention.

FIG. 2 is a cross-sectional end view of the cutting insert shown in FIG. 1 taken along the cross-sectional line, 2—2.

FIG. 3 is a side view of a cutting insert in accordance with the present invention wherein the center bearing is manufactured by using a plating technique.

FIG. 4 is a cross-sectional end view of the cutting insert shown in FIG. 3 taken along the cross-sectional line, 4—4.

FIG. 5 is a side view of the cutting insert in accordance with the present invention wherein the center bushing is formed by using a high energy forming technique.

FIG. 6 is a cross-sectional end view of the cutting insert shown in FIG. 5 taken along the cross-sectional line, 6—6.

FIG. 7 is a side view of the cutting insert in accordance with the present invention wherein the center bushing is secured to a cutting insert by using an expansion bushing.

FIG. 8 is a cross-sectional end view of the cutting insert shown in FIG. 7 taken along the cross-sectional line, 8—8.

FIG. 9 is a side view of a cutting insert in accordance with the present invention wherein the center bushing is provided with threads.

FIG. 10 is a cross-sectional end view of the cutting insert shown in FIG. 9 taken along the cross-sectional line, 10—10.

FIG. 11 is a cutting insert in accordance with the present invention wherein a set screw is used to secure a cutting insert assembly to a rotating spindle.

FIG. 12 is a cross-sectional end view of the cutting insert shown in FIG. 11 taken along the cross-sectional line, 12—12.

FIG. 13 is a side view of an alternative embodiment of the cutting insert shown in FIG. 11.

FIG. 14 is a cross-sectional end view of the cutting insert shown in FIG. 13 taken across the cross-sectional line, 14—14.

DESCRIPTION OF PREFERRED EMBODIMENT

Referring to FIGS. 1 and 2 of the drawings, a cutting insert in accordance with the present invention includes an insert body 10 which is fitted with a center bushing 12 having a central aperture 14 which is generally concentric about the longitudinal axis 16 of the cutting insert. As shown, the insert body 10 is formed to have a washer-like shape.

A locking flat 18 serves to prevent rotation of the center bushing 12 with respect to the cutting insert body 10.

The center bushing 12 may be braised, shrink-fit, or high temperature bonded to the inner surface of the cutting body insert 10. It is to be understood that machining may be used, as is necessary, to finish the side faces 20 and 22 of an insert body and have such side faces uniformly smooth.

The central aperture 14 provided on the center bushing 12 may be any of the standard sizes used for rotary cutting tools. Further, the central aperture 14 can be finished to fit a standard outer diameter for a stator or rotor on which a cutting insert is to be mounted and may be grooved or threaded to accommodate mounting requirements as discussed hereinafter.

As an alternative, the aperture 14 may be left semifinished and smaller than conventional stators and rotors on which the cutting insert may be mounted, to permit a user to drill, bore, mill, or grind the central aperture 14 to a desired size. Clearly when cutting inserts are left in such a semi-finished state users are able to take advantage of the soft metal core provided by the center bushing 12 to complete the fabrication of rotary cutting inserts to satisfy the user's own requirements. When such opportunity is taken advantage of, the user may reduce the size of the inventory being maintained, since the outer diameter and the thickness of the insert body would be the remaining two principal varying parameters.

As this point it is quite clear that less expensive machining and grinding techniques may be used to complete the fabrication of the semi-finished cutting insert in accordance with the present invention. Further, it is clear that since the insert body 10 is formed by using a smaller volume of expensive carbide material, cutting inserts manufactured in accordance with the present invention provide a substantial cost savings due to the use of less expensive carbide material.

Referring to FIGS. 3 and 4, the insert body 10 may be provided with a center bushing 24 by electro-plating, chemical plating or vapor plating a soft metal material on the interior hole of the insert body 10. As an example, the soft metal material may be copper, nickel, zinc, cadmium or other similar materials well known in the prior art.

As is to be expected, when a plating technique is employed to form the center bushing 24 the thickness of the material forming the bushing is likely to be thinner than would be the case of the embodiment illustrated by FIGS. 1 and 2.

Referring to FIGS. 5 and 6, a cutting insert in accordance with the present invention also may be provided with a center bushing 26 by using high energy forming techniques.

As is well known, in the use of such high-energy techniques, an aluminum or other sheathing is inserted into the central aperture of the insert body 10. The sheathing should be sized to fit within the central aperture of the insert body 10 and have other dimensions necessary to form a center bushing 26 having desired parameters. The high-energy forming techniques may simply involve an electro-magnetic field being applied within the alumimum sheathing to repulse it towards the insert body 10 and thereby bind the sheathing to the inner surface of the central aperture of the insert body 10. As an alternative, a conventional hydraulic forming process may be used.

The cutting insert so formed, would be either left in a semi-finished state or finished by being ground or bored to have the central aperture 28 concentric about the longitudinal axis of the finished cutting insert 16.

The edges 30 and 32 of the central aperture 28 may be sloped to permit the formation of locking flanges as shown in FIG. 6. Swaging may be used as required to give a locking effect to prevent longitudinal movement between an insert and the central bushing. Finishing of the faces of the cutting insert may be accomplished as necessary in any conventional manner.

Referring now to FIGS. 7 and 8, an expansion bushing 34 may be interposed between the insert body 10 and a center bushing 36. As illustrated by FIGS. 1 and 2, a locking flat 38 may be used. As shown, the expansion bushing 34 is shaped to have a flat portion matching the configuration of the inner surface of the central bore provided on the insert body 10.

The expansion bushing 34 also may be provided with a split portion 40 to facilitate the desired expansion.

As shown by FIG. 8, the inner surface 42 of the expansion bushing 34 and the outer surface of the center bushing 36 may be tapered to permit the center bushing 36 and the expansion bushing 34 to be snap fit. Ideally, the outer diameter of the center bushing 36 would be sized to snugly fit into the interior aperture of the expansion bushing 34.

A high temperature epoxy or bushing cement or similar material may be used as a void filler and for bonding between the insert body 10, the expansion bushing 34, and the center bushing 36.

As in previous embodiments, the central aperture 44 of the center bushing 36 may be left in a semi-finished state or finished to have a standard inner diameter and other characteristics suitable for mounting on a specific type of stator or rotor with which the finished cutting insert is intended to be used. For example, the interior surface of the central aperture 44 may be provided with locking threads 46 as shown in FIGS. 9 and 10.

Additional locking between the expansion bushing 34 and the center bushing 36 may be accomplished by having one surface of the expansion bushing 34 provided with a counter slope portion 48. The center bushing 36 may be swaged along the surface 50 to provide the desired locking effect between the expansion bushing 34 and center bushing 36.

Referring to FIGS. 9 and 10, location bores 52 and 54 may be provided on the two ends of the center aperture to receive a shoulder portion on the stator or rotor on which the cutting insert is to be mounted.

It is to be understood that any conventional steel or other composite material may be used to form the center bushing 36 and the expansion bushing 34 in accordance with the present invention, except in the instance of plating techniques and high-energy forming techniques being used as previously discussed.

Referring now to FIGS. 11 and 12, a center bushing 56 may be locked into position in the interior aperture of an insert body 10 by the use of swaging along the opposite edges 58 and 60 as an alternative to the use of a locking flat as shown in the embodiment illustrated by FIGS. 7 and 8.

Additional locking of a cutting insert on a stator, rotor or spindle may be accomplished by the use of a locking plunger 62 which is placed to be forced inwardly towards a stator, rotor or spindle on which an insert is mounted, by a cone set screw 64.

Referring to FIGS. 13 and 14, a similar technique involving a cone set screw may be used where a locking groove 66 is used to position and secure a cutting insert on a spindle, rotor, or stator of a rotary cutting tool. The insertion of a cone set screw into a channel 68 would cause slight expansion of the local portion of the center bushing 70 and thereby prevent possible rotation of the cutting insert on the spindle or rotor in which it may be mounted. The channel 68 may also serve as a rotational locking hole in which case the use of threads therein may be unnecessary. Locking would be accomplished by having a locking pin inserted throught the channel 68 and extend into a locking hole in the stator or rotor. Such locking would prevent any rotation between the insert and the stator or rotor on which it is mounted.

From the foregoing discussion, it is now clear that rotary cutting inserts in accordance with the present invention can be more cheaply manufactured, and more easily modified by users to accommodate immediate needs. Accordingly, smaller inventories of inserts can be maintained by users. Of equal importance is the enhanced ability to obtain absolute concentricity of the central bore of a cutting insert such that when multiple cutting inserts are used on a single rotary cutting tool, adjustments required to have the several cutting inserts in alignment are minimized.

It is to be understood that although the center bushings described herein are made of metal that it may be possible to form the center bushing with non-metallic material provided that the use of such material does not detract from the utility of the cutting insert when mounted on a rotary cutting tool.

It is to be further understood, that while the foregoing description has provided the details of center configurations involving apertures, that the opposite configuration including the use of a central stud is intended to be covered. As an example, the use of threads and locking set screws would be employed as may be desireable to satisfy the design requirements of a rotary cutting tool or rotary cutting cartridge with which a cutting insert, in accordance with the present invention is to be used.

While a preferred embodiment of the present invention has been described hereinabove, it is intended that all matter contained in the above description and shown in the accompanying drawings be interpreted as illustrative, and not in a limiting sense, and that all modifications, instructions and arrangements which fall within the scope and spirit of the invention may be made.

What is claimed is:

1. A cutting insert for rotary cutting tools, said cutting insert comprising:
   a cutting body having a washer-like configuration including an interior aperture;
   center bushing means for forming a central aperture for said cutting insert, said center bushing means being securely positioned in said interior aperture of said cutting body; and
   an expansion bushing interposed between said cutting body and said center bushing means, said expansion bushing serving to securely position said center bushing means in said interior aperture of said cutting body, said expansion bushing including an interior portion and an expansion slot for permitting radial expansion of said expansion bushing when said center bushing means is seated in said interior portion of said expansion bushing, said interior portion of said expansion bushing being tapered, said center bushing means having an outer surface adapted to be contiguous with said interior portion of said expansion bushing when said center bushing means is seated in said interior portion, said outer surface of said center bushing means being tapered to conform to the taper of said interior portion of said expansion bushing.

2. The cutting insert defined by claim 1, said central aperture having threads.

3. The cutting insert defined by claim 1, said interior aperture having a flattened portion, said expansion bushing further including an exterior surface having a flat section adapted to be seated contiguous to said flattened portion of said interior aperture.

4. The cutting insert defined by claim 3, wherein said cutting body is a carbide material or tool steel and said center bushing means is a material that is softer that said carbide material or tool steel.

5. The cutting insert defined by claim 4, said cutting body having an outer surface extending around a longitudinal axis which extends through said central aperture of said center bushing means, said central aperture being formed by interior walls which are concentric with said outer surface of said cutting body.

* * * * *